United States Patent [19]

Sato et al.

[11] 4,284,116
[45] Aug. 18, 1981

[54] PNEUMATIC TIRE FOR MOTORCYCLES

[75] Inventors: Takeshi Sato, Akigawa; Yoshinari Matsubara, Higashimurayama, both of Japan

[73] Assignee: Bridgestone Tire Co., Ltd., Tokyo, Japan

[21] Appl. No.: 118,717

[22] Filed: Feb. 5, 1980

[30] Foreign Application Priority Data

Feb. 19, 1979 [JP] Japan .................................. 54-17168

[51] Int. Cl.³ .............................................. B60C 9/18
[52] U.S. Cl. .................................. 152/360; 152/354 R
[58] Field of Search ............... 152/354 R, 357 R, 360, 152/361 R, 356

[56] References Cited

U.S. PATENT DOCUMENTS

| 1,987,350 | 1/1935 | Reel ...................................... 152/360 |
| 2,006,315 | 6/1935 | Hopkinson ............................ 152/360 |
| 2,979,100 | 4/1961 | Woodall ................................ 152/360 |
| 3,871,432 | 3/1975 | Lachut .................................. 152/360 |

Primary Examiner—John E. Kittle
Attorney, Agent, or Firm—Sughrue, Mion, Zinn, Macpeak and Seas

[57] ABSTRACT

A pneumatic tire for motorcycles having an excellent high speed running stability comprising a stress relieving rubber layer interposed between carcass plies and covering the center of a crown portion of the carcass over a range from 10% to 50% of the total width measured along the outer contour of a tread portion.

6 Claims, 2 Drawing Figures

PNEUMATIC TIRE FOR MOTORCYCLES

BACKGROUND OF THE INVENTION

1. Field of the Invention

This invention relates to pneumatic tires for two-wheeled vehicles and more particularly to a pneumatic tire for motorcycles which can improve high speed running stability.

2. Description of the Prior Art

Motorcycles (hereinafter called two-wheeled vehicles) are far more influenced by exterior disturbance due to undulation or local inclination of the road surface, side wind and non-uniformity of the tire or the like when the vehicles run when compared with four-wheeled vehicles. Particularly, if the two-wheeled vehicle running straight ahead at a high speed is subjected to the exterior disturbance in the horizontal direction, the vehicle body becomes severely oscillated. Particularly, the exterior disturbance subjected to the front wheel induces a conspicuous handle bar oscillation so that a driver feels apprehensive, and eventually cannot continue the vehicle.

The inventor's investigations have demonstrated the result that even if a new tire including a tread rubber whose gauge is sufficiently large is subjected to a force changeable in the horizontal direction and causing the above mentioned vehicles's oscillation, almost all such force is absorbed by the tread rubber and hence the vehicle's oscillation is not induced. On the contrary, as the tread rubber becomes worn the remaining tread rubber loses its oscillation absorbing ability, the force changeable in the horizontal direction is transmitted through the tire carcass and wheel to the vehicle body. In addition, it has been ascertained that the above mentioned phenomenon is accelerated when use is made of a carcass ply having a high strength for the purpose of reducing the weight of tire and making the tire suitable for a high speed running and hence the number of the carcass plies is reduced.

SUMMARY OF THE INVENTION

An object of the invention, therefore, is to provide a pneumatic tire for motorcycles which can effectively eliminate the oscillation of the vehicle body based on the above mentioned recognition.

Another object of the invention is to provide a pneumatic tire for motorcycles which has an excellent high speed running stability irrespective of the extent of wear of the tread rubber.

A feature of the invention is the provision in a pneumatic tire for motorcycles having an excellent high speed stability comprising a toroidal-shaped carcass composed of a plurality of plies each formed of textile cords covered with coating rubber and angularly arranged with respect to the circumferential direction of the tire and extending from one of a pair of annular bead portions to the other bead portion and a tread portion formed about a crown portion of the carcass and extending along the outer contour of the crown portion from both sides thereof to a position near the maximum width position of the carcass, of the improvement comprising a stress relieving rubber layer interposed between the above mentioned plies of the carcass and covering the center of the crown portion over a range from 10% to 50% of the total width measured along the outer contour of the above mentioned tread portion.

Further objects and features of the invention will be fully understood from the following detailed description with reference to the accompanying drawings, wherein:

DETAILED DESCRIPTION OF THE PREFERRED EMBODIMENTS

Figure 1:
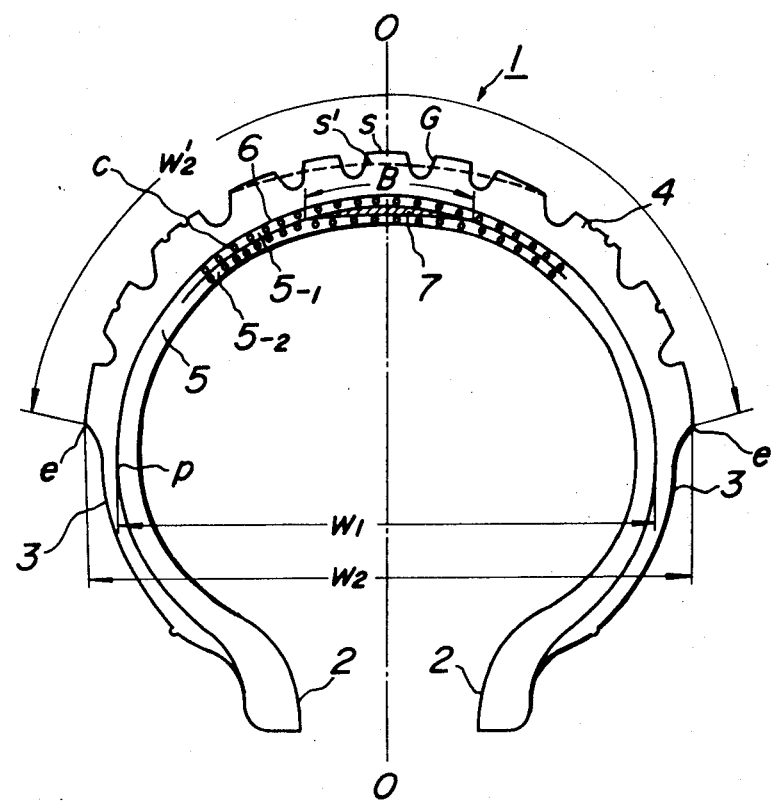
FIG. 1 is a cross-sectional view of one embodiment of a pneumatic tire for motorcycles according to the invention.
Figure 2:
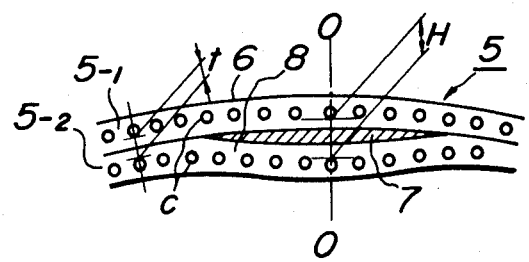
FIG. 2 is a partial cross-sectional view of the carcass shown in FIG. 1 in an enlarged scale.

Referring to FIGS. 1 and 2, reference numeral 1 designates a tire as a whole. The tire 1 comprises a pair of annular bead portions 2 located at the innermost side in the radial direction of the tire, a pair of side portions 3 and a tread portion 4 extending across the two side portions 3, 3. In the usual manner, these portions are reinforced by a toroidal-shaped carcass 5 extending from one of the bead portions 2 to the other bead portions 2. The carcass 5 is composed of a plurality of plies each formed of textile cords C such as nylon, rayon, polyester or the like and coated with coating rubber. The textile cords C are inclined at an angle within a range from 25° to 45° with respect to the circumferential direction of the tire, that is, the equatorial plane O—O thereof. In FIGS. 1 and 2, the carcass ply is composed, for example, of 2 plies $5_{-1}$ and $5_{-2}$. Alternatively, the carcass ply may be composed of 3 plies, 4 plies and eventually, 5 plies and 6 plies. About a crown portion 6 of the carcass 5 may be superimposed one or a plurality of breakers (not shown) for the purpose of reinforcing the crown portion 6 of the carcass 5.

According to the conventional feature of the two-wheeled vehicle's tire, the width of the tread portion 4 is made wide so that the tread portion 4 extends sidewardly along the outside the crown portion 6 of the carcass 5 to a position near a base point P at which the maximum width $W_1$ of the carcass 5 is measured. Hence, the maximum width $W_2$ of the tire is measured at tread end e. Between the plurality of plies, the plies $5_{-1}$ and $5_{-2}$ in the present embodiment shown is interposed a stress relieving rubber layer 7 having a center substantially arranged at the equatorial plane O—O. The width B of the stress relieving rubber layer 7 is determined within a range of a main portion of the ground contact width of the tire when it runs straight by taking into consideration the width of the worn surface S' shown by dotted lines taken by the surface S of the tread portion 4 when the tire arrives at its worn limit due to long distance running. That is, the width B of the stress relieving rubber layer 7 is determined within a range from 10% to 50%, preferably from 15% to 35% of the total width $W'_2$ of the tread portion 4 measured along the outer contour of the surface of the tread portion 4.

It is preferable to make H/t a range from 1.4 to 10.0, more preferably from 1.7 to 6.5 where t is a total gauge of the coating rubber 8 of the carcass plies $5_{-1}$, $5_{-2}$ adjacent to both surfaces of the stress relieving rubber layer 7 and H is the maximum gauge of rubber located between the carcass plies inclusive of t, H being measured at substantially the equatorial plane O—O.

The reasons why the value of H/t is made within above mentioned range are as follows. If H/t is smaller than 1.4, the oscillation absorbing effect of the stress relieving rubber layer 7 becomes insufficient. On the contrary, if H/t exceeds 10.0 the maneuverable stability of the tire becomes degraded.

The modulus of the stress relieving rubber layer 7 is dependent on the width B and the maximum gauge (H-t) thereof. It is preferable to make the modulus of the stress relieving rubber layer 7 within a range from 16 kg/cm$^2$ to 30 kg/cm$^2$ at 100% elongation and make it equal or smaller than that of the coating rubber of the carcass ply.

In addition, it is preferable to make the hardness of the stress relieving rubber layer 7 at most equal to that of the coating rubber 8 of the carcass ply 5.

In order to ascertain the effect of the present invention, comparative running tests were carried out on a tire including a stress relieving rubber layer and having a size of 3.25H19 according to the invention and on a conventional tire without including a stress relieving rubber layer and having the same size as above mentioned size. Both the tire according to the invention and the conventional tire comprise a carcass composed of 2 plies each formed of nylon cords of 1,260 d/2 and inclined at an angle of 34° with respect to the equatorial plane of the tire, the cords of one of the plies being crossed with the cords of the other ply.

The tire according to the invention is designated by A and the conventional tire is designated by B and the essential dimensions of these tires A and B are shown in the following Table.

|  | Tire | A | B |
|---|---|---|---|
| Rubber layer 7 | Modulus (kg/cm$^2$) | 20 | — |
|  | Width B (mm) | 30 | — |
|  | Ratio (B/W$_2$') | 0.2 | — |
|  | Gauge (H/t) | 4.2 | — |
| Coating rubber 8 | Modulus (kg/cm$^2$) | 24 | 24 |
|  | Gauge t (mm) | 0.24 | 0.24 |

The tires A and B were united with a rim and inflated by applying an internal pressure of 2.0 kg/cm$^2$ and then mounted on the front wheel of the vehicle.

Straight running and cornering tests on new tires A and B at a speed of 100 km/h have shown the result that both the new tires A and B showed no oscillations.

Straight running and cornering tests on the tires A and B which have been removed from the front wheel of the vehicle and brought into worn condition by buffing the surface S of the tread portion 4 at the equatorial plane O—O up to a contour S' shown by dotted lines in FIG. 1 which is distant apart from the surface S by ½ the depth of a groove G. The above tests have demonstrated the result that the tire A according to the invention showed no abnormality in the straight running and cornering tests. But, the conventional tire B which is not provided with the stress relieving rubber layer induced considerably large vehicle body oscillation in the straight running test. The above tests were effected on an oblong test course having one round of 5.5 km and the minimum radius of 400 m and paved with concrete and occurrence of the vehicle body oscillation was decided by the presence and absence of the handle oscillation due to the exterior disturbance transmitted from the rough concrete road surface. In the cornering tests, the tires A and B turned on the flat road surface with the tires inclined at camber angles without using the test course bank.

As stated hereinbefore, the pneumatic tire for motorcycles according to the invention is capable of effectively absorbing vehicle body oscillations that tend to be induced when a two-wheeled vehicle, particularly a two-wheeled vehicle adapted to run at a high speed runs at a high speed irrespective of the extent of the tread wear.

What is claimed is:

1. In a pneumatic tire for motorcycles having an excellent high speed stability comprising a torodial-shaped carcass composed of a pair of plies each formed of textile cords covered with coating rubber and extending from one of a pair of annular bead portions to the other bead portion, a tread portion superimposed about a crown portion of said carcass and extending along the outer contour of said crown portion to such an extent that the tread has a width larger than a maximum width between sidewalls of the tires, and a lenticular stress relieving rubber layer interposed between said plies of said carcass symmetrically with respect to the equatorial plane of the tire, the improvement comprising, said stress relieving rubber layer having a width of 15% to 35% of a tread width measured along the outer contour of said tread portion, and a modulus of 16 kg/cm$^2$ to 30 kg/cm$^2$ at 100% elongation.

2. The tire according to claim 1, wherein said stress relieving rubber layer has a hardness which is at most equal to that of the coating rubber of said carcass ply.

3. The tire according to claim 1, wherein said stress relieving rubber layer has a maximum gauge defined by H/t of 1.4 to 10.0 where t is a total gauge of the coating rubber of the carcass plies adjacent to both surfaces of said stress relieving rubber layer and H is the maximum gauge between said carcass plies inclusive of said total gauge t.

4. The tire according to claim 3, wherein said H/t is 1.7 to 6.5.

5. The tire according to claim 1, wherein said stress relieving rubber layer has the modulus smaller than a modulus of coating rubber of the carcass ply.

6. The tire according to claim 1, wherein said width of the stress relieving rubber layer is defined within a range of a main portion of the ground contact width of the tire when it runs straight.

* * * * *